United States Patent Office 3,206,468
Patented Sept. 14, 1965

3,206,468
METHODS OF PREPARING BENZIMIDAZOLES
Victor J. Grenda, Edison, N.J., assignor to Merck & Co., Inc., Rahway, N.J., a corporation of New Jersey
No Drawing. Filed Nov. 15, 1963, Ser. No. 323,901
9 Claims. (Cl. 260—302)

This application is a continuation-in-part of copending application Serial No. 216,308, filed on August 13, 1962, as a joint application of Robert E. Jones and Victor J. Grenda.

This invention relates generally to the preparation of 2-substituted benzimidazoles. More particularly it is concerned with a new and novel method of making 2-substituted benzimidazoles. Still more specifically it is concerned with a method of obtaining 2-substituted benzimidazoles by the oxidation of N-phenyl amidines.

Benzimidazoles substituted at the 2-position with a variety of substituents, and particularly with alkyl, aryl, aralkyl and hetero radicals, have been described in the chemical literature. They have a variety of uses. Some of them, especially the 2-aryl and 2-hetero benzimidazoles, have anthelmintic properties. Others are useful as antimetabolities.

The scientific literature describes several syntheses of benzimidazoles. Although many of such processes are useful for making benzimidazoles having a wide variety of substitutents at the 2-position, they have certain inherent disadvantages. Consequently, research has continued toward the discovery of new, more direct and less expensive syntheses. One object of the present invention is to provide a new method of making 2-substituted benzimidazoles. Another object is provision of a direct synthesis which utilizes readily accessible and inexpensive starting materials.

An additional object is provision of a direct oxidative process that utilizes well-known and available oxidizing agents. Other objects will become apparent from the following description of the invention.

In accordance with the present invention, it has now been found that benzimidazoles having an alkyl, aryl, aralkyl or heteroaromatic substitutent at the 2-position may be produced directly by treatment of an N-phenyl amidine of the formula

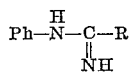

with a suitable oxidizing agent. In the above formula Ph represents a phenyl radical, and R may be an alkyl, aryl, aralkyl or heteroaryl radical. The oxidizing agents which have been found to bring about the direct oxidative cyclization of N-phenyl amidine to benzimidazole are lead tetra-acetate, alkali metal ferricyanide and sulfur. If desired, the tetra-acetate may be formed in situ in the oxidation reaction mixture from a lead oxide and acetic acid.

The process of the invention is conducted by intimately contacting the N-phenyl amidine with at least an equimolar amount of oxidizing agent. An excess of oxidant may be used, if desired, although no advantage is realized with indiscriminately large amounts and a molar ratio of oxidizing agent to amidine greater than about 6:1 is generally avoided.

The oxidation is carried out on the N-phenyl amidine base. Although the amidines are frequently obtained synthetically as hydrohalic acid addition salts, such salts are readily neutralized by treatment with a base. The neutralization may, of course, be done as a separate operation, but it is also possible to charge the amidine salt to the reaction and to generate the free base in situ by addition of sufficient alkali to the reaction mixture. This in situ generation of amidine base is preferred in those cases where the oxidative cyclization is carried out in an aqueous reaction medium. When organic solvents are used as the reaction medium, it is preferred to change the amidine as the free base, again because of solubility properties.

As is to be expected, the optimum reaction time will depend to some extent on whether lead tetra-acetate alkali metal ferricyanide or sulfur is employed as the oxidizing agent. Generally, the oxidative cyclization of N-phenyl amidine to 2-substituted benzimidazole is a fairly rapid reaction. With lead tetra-acetate, the preferred oxidizing agent of this invention, it is essentially complete in from ½ to 5 hours, and usually in less than 1 hour. Since excellent results are obtained by using one mole of oxidizing agent per mole of amidine, completion of the reaction is conveniently determined by measuring the disappearance of oxidizing agent. This can, of course, be readily followed by methods known to those skilled in the art, e.g., by the potassium iodide-starch test for reagents such as lead tetra-acetate. Somewhat longer reaction times, i.e. from 5 to 30 hours, are preferred when an alkali metal ferricyanide is used as oxidizing agent.

The preferred solvent medium for carrying out the process of this invention will also depend on the particular oxidizing agent employed. With an alkali metal ferricyanide such as sodium or potassium ferricyanide, it is convenient to use a reaction medium comprising water alone or water and a water-miscible organic solvent such as dioxane or dimethyl formamide. The organic solvent serves to solubilize the N-phenyl amidine base. The organic solvent should, of course, be one that is not itself subject to oxidation by the ferricyanide. When lead tetra-acetate is the oxidizing agent employed to convert the N-phenyl amidine to the benzimidazole, glacial acetic acid or an inert organic solvent like benzene, nitrobenzene or tetrachlorethane are very satisfactory reaction solvents.

The process of the invention is usually carried out at an elevated temperature, and preferably at temperatures between about 50° and 125° C. In those cases were sulfur is used as the oxidizing-cyclizing agent, the reaction can be carried out in the absence of an aqueous or organic solvent by merely heating or fusing the N-phenyl amidine, and sulfur. In these latter instances, temperatures of between 200° and 300° C. are generally employed for most satisfactory results.

In general, the 2-substituted benzimidazoles produced by the process of this invention are insoluble or only slightly soluble in water, and precipitate directly from an aqueous reaction medium. In those cases where the end product is soluble in the reaction solvent, it is conveniently recovered by removal of the solvent, and purified by techniques that will be known to those skilled in this art, e.g., trituration with water, recrystallization from organic solvents, or reprecipitation by neutralization of an aqueous solution of a benzimidazole hydrohalic acid addition salt.

The process of this invention, namely the reaction of an N-phenyl amidine with lead tetra-acetate, alkali metal ferricyanide or sulfur, results in the direct production of the corresponding 2-substituted benzimidazole, and is applicable to the synthesis of a wide variety of 2-substituted benzimidazoles. As previously stated, the amidine starting material may be represented by the general formula:

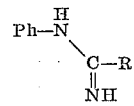

where Ph is the phenyl radical, and R is alkyl, aryl, aralkyl or heteroaryl. The phenyl radical may be further substituted with substituents that do not interfere with the course of the reaction, e.g. those that would not consume the oxidizing agent. Substituents such as lower alkyl, lower alkoxy, halogen, phenyl, nitrophenyl, halophenyl, alkylphenyl are examples of those which may be attached to the phenyl radical of the N-phenyl amidine. It is preferred that such substituents be in the meta or para positions with respect to the amidine point of attachment, in which case the substituents will be in the 5- and/or 6-positions of the resulting benzimidazole. This may be pictured structurally as:

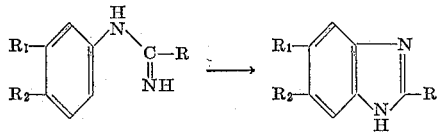

where $R_1$ and $R_2$ are substituents resistant to oxidation with lead tetra-acetate, alkali metal ferricyanide or sulfur. Best results in the oxidation and cyclization process of the invention are obtained when the $R_1$ or $R_2$ substituent is one that does not greatly affect the electron density of the phenyl radical. When these substituents are of the electron-donating or electron-withdrawing type, the yield of the desired benzimidazole may be lowered.

By appropriate choice of N-phenyl amidine starting material, the oxidation processes of this invention may be used for making a wide variety of 2-substituted benzimidazoles. Typical examples of 2-substituted benzimidazoles which may be obtained by treatment of the appropriate amidine with lead tetra-acetate, alkali metal ferricyanide or sulfur are (a) 2-aryl benzimidazoles, where the aryl radical may be phenyl, naphthyl or substituted phenyl and naphthyl radicals, examples of which are halophenyl tolyl, alkoxyphenyl, nitrophenyl, and halonaphthyl, from the corresponding N-phenyl aryl amidines;

(b) 2-aralkyl benzimidazoles from N-phenyl aralkyl amidines, examples of aralkyl groups being benzyl, phenethyl and phenylpropyl;

(c) 2-alkyl benzimidazoles, and preferably 2-loweralkyl benzimidazoles such as the 2-methyl, ethyl, propyl, butyl, amyl and the like from the corresponding N-phenyl alkylamidines.

The oxidative cyclization of this invention is particularly well suited to the synthesis of benzimidazoles wherein the 2-substituent is a heterocyclic radical, and particularly a five or six-membered heteroaromatic radical, such as pyridyl, pyrimidyl, thienyl, furyl, pyrryl, isoquinolyl, oxazolyl, thiazolyl, thiadiazolyl, isothiazolyl, pyrazolyl, pyrazinyl, quinolinyl, or imidazolyl, from the corresponding N-phenyl heteroaromatic amidine.

A preferred embodiment of the invention is application of the process for the synthesis of 2-heteroaromatic and 2-aryl benzimidazoles. Of particular importance is the synthesis, from the corresponding N-phenyl amidines, of benzimidazoles having a five-membered heteroaromatic ring at the 2-position, where the hetero ring contains at least 2 carbon atoms and where the hetero ring atoms are sulfur, nitrogen and/or oxygen. Of these, the preparation of 2-thiazolyl benzimidazoles are especially preferred.

Representative examples of 2-heteroaromatic and 2-aryl benzimidazoles which are conveniently prepared according to the process of this invention are 2-(2'-thiazolyl)-benzimidazole, 2-(4'-thiazolyl)-benzimidazole, 2-(4'-isothiazolyl)-benzimidazole, 2-(5'-thiazolyl)-5-phenyl-benzimidazole, 2-(4'-thiazolyl)-5,6-dimethyl benzimidazole, 2-(2'-thiazolyl)-5-methoxy benzimidazole, 2-[3'-(1',2',5',-thiadiazolyl)]-benzimidazole, 2-(2'-furyl)-benzimidazole, 2-(3'-thienyl)-benzimidazole, 2-(2'-pyrryl)-benzimidazole, 2-(3'-pyridyl)-benzimidazole, 2-(4'-oxazolyl)-benzimidazole, 2-(3'-pyridyl)-5-fluoro benzimidazole, 2-(1'-pyrazolyl)-benzimidazole, 2-(2'-pyrazinyl)-benzimidazole, 2-phenyl benzimidazole, 2-(o-fluorophenyl)-benzimidazole and 2-naphthyl benzimidazole, 2-(phenethyl)-5-chlorobenzimidazole and 2-(benzyl)-5-methylbenzimidazole.

As will be appreciated by those skilled in this art, the oxidation process of the present invention is applicable to the synthesis of bi-benzimidazoles of the general structure

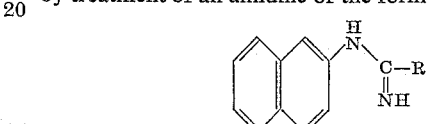

where A represents a lower alkylene, aryl or heteroaryl radical, from the corresponding bi-N-phenyl amidines. Such bi-benzimidazoles are useful as optical bleaching agents or as intermediates in making optical bleaching agents.

Also within the purview of the invention is the synthesis of 2-substituted naphthimidazoles and aza-benzimidazoles by treatment of an amidine of the formula

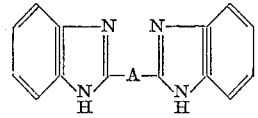

or

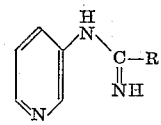

where R is as defined above, with lead tetra-acetate, alkali metal ferricyanide or sulfur.

The following examples are given for the purpose of illustration and not by way of limitation.

*Example 1*

To a solution of 5 g. (20.8 mmoles) of N-phenyl(thiazole-4-amidine) hydrochloride in 50 ml. of water there is added a solution containing 13.7 g. (41.6 mmoles) of potassium ferricyanide and 5.3 g. (62.4 mmoles) of sodium bicarbonate in 60 ml. of water. The reaction mixture is refluxed for 27 hours and the pH then adjusted to 1 with concentrated hydrochloric acid. The mixture is treated with 0.5 g. of decolorizing charcoal, filtered and the pH of the filtrate adjusted to 6 with sodium hydroxide. 2-(4'-thiazolyl)-benzimidazole precipitates and is recovered by filtration.

*Example 2*

An intimate mixture of 1 g. of N-phenyl(thiazole-4-amidine) and 0.17 g. of sulfur is heated at 250° C. for one hour (until hydrogen sulfide evolution ceases). The resulting residue is recrystallized from hot hydrochloric acid. 2-(4'-thiazolyl)-benzimidazole is obtained as a solid by adjusting the pH of the acidic suspension to 6 with sodium hydroxide. The product is separated by filtration and dried (M.P. 300–302° C.).

*Example 3*

To a suspension of 4.39 g. (9.90 mmoles) of lead tetra-acetate in 4 ml. of benzene there is added with stirring 2.00 g. (9.90 mmoles) of N-phenyl(thiazole-4-amidine). The mixture is refluxed for 10 minutes (until dissipation of the lead tetra-acetate by potassium iodide-starch test paper) and then concentrated to an oil. The oil is triturated in 20 ml. of water whereupon 0.88 g. of 2-(4'-thiazolyl)-benzimidazole precipitates. The product is isolated by filtration (M.P. 300–301° C.) and further purified by recrystallization (as the hydrochloride salt) from water.

*Example 4*

A mixture of 1.34 g. (10 mmoles) of N-phenylacetamidine in 10 ml. of benzene is added with stirring to a suspension of 4.43 g. (10 mmoles) of lead tetra-acetate in 5 ml. of benzene. The reaction mixture is refluxed for 30 minutes and then concentrated essentially to dryness in vacuo. The residue thus obtained is slurried with 3 x 5 ml. of water, and the water removed from the water insoluble 2-methylbenzimidazole. The solid product is dried (M.P. 173–176° C.).

Example 5

A solution of 5.1 g. (20.8 mmoles) of N-phenyl phenylacetamidine hydrochloride in 80 ml. of water is mixed with a solution of 13.7 g. (41.6 mmoles) of potassium ferricyanide and 5.3 g. (62.4 mmoles) of sodium bicarbonate in 60 ml. of water. The mixture is refluxed for 9 hours, then cooled and the pH adjusted to 1 with concentrated hydrochloric acid. The resulting acidic solution is treated with 0.5 g. of activated charcoal, and then filtered to remove the charcoal. The pH of the filtrate is adjusted to 6–7 with sodium hydroxide solution to precipitate 2-benzyl benzimidazole. The solid is filtered off and reprecipitated from aqueous ethanol to give 2-benzyl benzimidazole (M.P. 181–184° C.).

Example 6

To a suspension of 44.3 g. (0.10 mole) of lead tetraacetate in 110 ml. of benzene there is added with stirring 19.6 g. (0.10 mole) of N-phenylbenzamidine. The mixture is refluxed until the reaction shows a negative potassium iodide-starch paper test, and is then concentrated in vacuo to a residue. This residue is triturated with water and the solid dried in vacuo. It is then recrystallized from benzene to give 2-phenylbenzimidazole (M.P. 296–297° C.).

Example 7

To a suspension of 4.43 g. (10 mmoles) of lead tetraacetate in 5 ml. of tetrachloroethane there is added with stirring 2.01 g. (10 mmoles) of N-phenyl(thiophene-3-carboxamidine) in 10 ml. of tetrachloroethane. The reaction mixture is stirred for 15 minutes at 90° C., and the solvent then removed by vacuum distillation. The residue is crystallized from about 10 ml. of water to give 2-(3'-thienyl)-benzimidazole.

Example 8

A suspension of 4.43 g. (10 mmoles) of lead tetraacetate in 5 ml. of nitrobenzene is treated with 2.02 g. (10 mmoles) of N-phenyl(thiazole-2-amidine) in 8 ml. of nitrobenzene at 120° C. for 15 minutes. At the end of this time the mixture is concentrated to dryness in vacuo. The residue is triturated with water to give crystalline 2-(2'-thiazolyl)-benzimidazole.

Example 9

To a suspension of 4.43 g. (10 mmoles) of lead tetraacetate in 4 ml. of benzene there is added 1.92 g. (10 mmoles) of N-(4-methoxyphenyl)-propionamidine in 10 ml. of benzene. The reaction mixture is refluxed for 15 minutes and then concentrated in vacuo to a colored residue. This residue is triturated with water to dissolve the inorganic salts. Upon removal of the water 2-propyl-5-methoxyphenzimidazole remains as an off-white solid.

Example 10

A solution of 2.34 g. (10 mmoles) of N-phenyl-nicotinamidine hydrochloride in 20 ml. of water is mixed with a solution of 6.58 g. (20 mmoles) of potassium ferricyanide and 2.52 g. (30 mmoles) of sodium bicarbonate in 30 ml. of water. The mixture is refluxed for seventeen hours. It is cooled to room temperature and adjusted to pH 1 with dilute hydrochloric acid. The acidified solution is treated with 0.3 g. of decolorizing charcoal, the charcoal removed by filtration, and the filtrate concentrated in vacuo to about ⅕ volume. It is neutralized with sodium carbonate, whereupon 2-(3'-pyridyl)-benzimidazole precipitates. The product is recovered by filtration and air dried.

Example 11

An intimate mixture of 2.14 g. (10 mmoles) of N-phenyl(2-fluorobenzamidine) and 0.34 g. (10.6 mmoles) of sulfur is heated at 220° C. for 85 minutes (until hydrogen sulfide evolution ceases). The residue is cooled and extracted five times with 3 ml. portions of hot dilute hydrochloric acid. The hydrochloric acid extracts are combined and neutralized with sodium bicarbonate. 2-(2'-fluorophenyl)-benzimidazole precipitates, and is recovered by filtration.

Example 12

2.93 g. (10 mmoles) of ethyl terphthalimidate dihydrochloride and 1.96 g. (21 mmoles) of aniline are added to 50 ml. of ethanol and the mixture stirred for 10 hours at room temperature. During this time phenylene-1,4-di-(N-phenylamidine)-dihydrochloride precipitates:

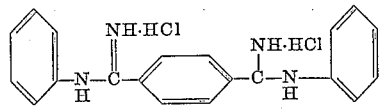

It is recovered by filtration, and converted to the free base by treatment with sodium carbonate.

A suspension of 4.43 g. (10 mmoles) of lead tetra-acetate in 18 ml. of benzene is mixed with 1.57 g. (5 mmoles) of phenylene-1,4-di-(N-phenylamidine) and the mixture heated at the reflux temperature until all of the lead tetraacetate is consumed (tested by potassim iodide-starch paper). The benzene is removed by concentration in vacuo, and the residue triturated with water. 1,4-di-(2'-benzimidazolyl) benzene separates as a solid and is recovered by fiitration.

Example 13

To a solution of 2.00 g. of N-(4'-methylphenyl)-furan-2-amidine hydrochloride in 45 ml. of water there is added a solution of 6.8 g. of potassium ferricyanide and 2.7 g. of sodium bicarbonate in 30 ml. of water. The resulting solution is refluxed for 12 hours. It is then cooled to room temperature and adjusted to pH 1 with concentrated hydrochloric acid. The solution is treated for 5 minutes with decolorizing charcoal, and the charcoal then removed by filtration. The filtrate is brought to pH 7 with sodium hydroxide. 2-(2'-furyl)-5-methylbenzimidazole precipitates, and is recovered by filtration and air dried.

Many of the N-phenyl amidines, or acid addition salts thereof, used as starting materials in the process of our invention are described in the chemical literature. These as well as those not specifically described in the literature, may be conveniently prepared by reacting together aniline or a nuclearly substituted aniline with a nitrile in the presence of aluminum chloride:

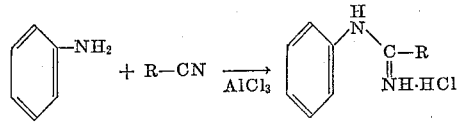

where R may be aryl, heteroaryl, aralkyl or alkyl. The details set forth below for making N-phenyl (thiazole-4-amidine) in this way may be applied to the synthesis of other N-phenyl amidines:

3.0 g. of 4-cyanothiazole (0.0275 mole) is added to 2.75 g. of aniline at 25° C., and 3.65 g. (0.0275 mole) of powdered aluminum chloride gradually stirred into the mixture over a period of 20 minutes. An exothermic reaction ensues and the temperature of the reaction mixture rises to about 120–130° C. After the addition of aluminum chloride is complete, the reaction mixture is heated at 180° C. for 20 minutes. It is then cooled to room temperature and the reaction mass dissolved in 100 ml. of 75% ethanol. The resulting solution is made strongly alkaline with 25% aqueous sodium hydroxide solution and then extracted with 3 x 70 ml. of chloroform.

The chloroform extracts are combined, washed with water and dried over potassium carbonate. The chloroform solution is filtered and treated with 1.0 g. of decolorizing charcoal. The charcoal is removed by filtration and the charcoal treatment repeated once more. The resulting yellow solution is concentrated to dryness in vacuo and the residue dissolved in 25 ml. of isopropanol. The pH of the solution is adjusted to 1–1.5 with isopropanolic hydrogen chloride and 500 ml. of ether added slowly, with stirring, at about 10° C. After addition of ether is complete, the mixture is stirred for 1 hour and the resulting solid removed by filtration. The solid is washed with small portions of ether and petroleum ether and then dried in vacuo at 25° C. to give 5.7 g. of N-phenyl(thiazole-4-amidine)hydrochloride, M.P. 255–257° C.

When 2-cyanothiazole is employed in the above process, there is obtained N-phenyl(thiazole-2-amidine)hydrochloride. The N-phenylamidine derivatives of other compounds are obtained in a similar fashion by reacting the appropriate cyano compound with equimolar amounts of aniline and aluminum chloride as described above. When a 3- or 4-substituted aniline is used as starting material instead of aniline itself, the corresponding N-(3- or 4-substituted) phenylamidine is produced.

The cyano derivatives of the compounds which are employed to make the starting materials for this invention are prepared from the corresponding carboxylic acid derivatives by the process exemplified below for making 4-cyanothiazole from thiazole-4-carboxylic acid:

60 g. of dry thiazole-4-carboxylic acid is added with stirring to 146 ml. of thionyl chloride. The reaction mixture is heated under gentle reflux for 2 hours. The excess thionyl chloride is then removed in vacuo, and 300 ml. of petroleum ether added slowly to the oily residue. The resulting mixture which contains precipitated thiazole-4-carboxylic acid chloride is cooled to 15° C., and the desired acid chloride removed by filtration. It is washed with cold petroleum ether and dried in vacuo, M.P. 85° C.

Approximately 14 g. of dry ammonia gas is added to a solution of 40 g. of thiazole-4-carboxylic acid chloride in 300 ml. of benzene over a period of 1 hour. The temperature is maintained at 30–35° C. The reaction mixture is then aged for 1 hour at 25° C. The solid product is removed by filtration and dried in vacuo. It is suspended in 130 ml. of cold water to dissolve ammonium chloride. The suspension is filtered and washed with cold water. The wet solid is then dissolved in 150 ml. of boiling water, the solution treated with decolorizing charcoal, filtered while hot and cooled to 5° C. The crystalline thiazole-4-carboxamide thus obtained is recovered by filtration and dried in vacuo at 40° C., M.P. 152–153° C.

24 g. of thiazole-4-carboxamide and 20 g. of phosphorus pentoxide are intimately mixed in a round bottomed flask fitted with a short condenser and a receiver. The mixture is heated in an oil bath at a bath temperature of 200–220° C. for 20 minutes. The mixture is then distilled, 4-cyanothiazole distilling at 100–120° C./20 mm. The product is purified by sublimation (65° C./30 mm.), M.P. 60–61° C.

The N-pyridyl and N-naphthyl amidines which are starting materials for synthesis of azabenzimidazoles and naphthimidazoles according to this invention are obtained as described above from the appropriate aminopyridine or aminonaphthalene.

As previously stated, the benzimidazoles obtained by the process of this invention have a variety of known uses. Those wherein the 2 substituent is an aryl or hetero ring have a high degree of anthelmintic activity and may be used for the treatment of helminthiasis in domestic animals. For this purpose, they are administered orally to the animals in relatively small amounts. The bi-benzimidazoles described above have valuable properties as optical brightening agents, and benzimidazoles having alkyl or aralkyl groups at the 2-position have important antimetabolite properties.

Any departure from the above description which conforms to the present invention is intended to be included within the scope of the claims.

What is claimed is:

1. The process for making a 2-substituted benzimidazole of the formula

BZ—R where BZ represents the benzimidazole nucleus and R is selected from the class consisting of aryl, heteroaryl, aralkyl and alkyl radicals, that comprises treating an amidine of the formula

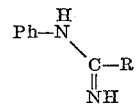

with an oxidizing agent selected from the class consisting of lead tetra-acetate, alkali metal ferricyanide, and sulfur, where Ph represents a phenyl ring.

2. The process for preparing 2-thiazolyl benzimidazole that comprises treating N-phenyl(thiazole-amidine) with lead tetra-acetate.

3. The process for preparing 2-(4'-thiazolyl)-benzimidazole that comprises treating N-phenyl(thiazole-4-amidine) with lead tetra-acetate.

4. The process for preparing 2-phenyl benzimidazole that comprises treating N-phenyl benzamidine with lead tetra-acetate.

5. The process for preparing 2-thienyl benzimidazole that comprises treating N-phenyl(thiophene-amidine) with lead tetra-acetate.

6. The process for preparing 2-(thiazolyl) benzimidazole that comprises treating N-phenyl(thiazole-amidine) with alkali metal ferricyanide.

7. The process for preparing 2-phenyl benzimidazole that comprises treating N-phenyl benzamidine with alkali metal ferricyanide.

8. The process for making a 2-heterocyclic benzimidazole wherein the heterocyclic ring of the 2-substituent contains at least two carbon atoms and wherein the hetero atoms are selected from the class consisting of oxygen, sulfur and nitrogen, that comprises reacting an N-phenyl (heterocyclic amidine) wherein the heterocyclic radical is as previously defined, with an oxidizing agent selected from the class consisting of lead tetra-acetate, alkali metal ferricyanide and sulfur.

9. The process for making a bi-benzimidazole of the formula

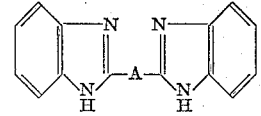

where A is selected from the class consisting of phenyl and heteroaryl, that comprises treating an amidine of the formula

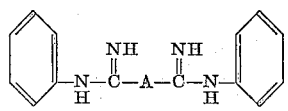

where A is as defined above, with an oxidizing agent selected from the class consisting of lead tetra-acetate, alkali metal ferricyanide and sulfur.

No references cited.

NICHOLAS S. RIZZO, *Primary Examiner*.